US008462363B1

United States Patent
Keithley

(10) Patent No.: US 8,462,363 B1
(45) Date of Patent: *Jun. 11, 2013

(54) FASTER MONOCHROME PRINTING FOR IN-LINE ELECTROPHOTOGRAPHIC COLOR PRINTERS

(75) Inventor: Douglas G. Keithley, Boise, ID (US)

(73) Assignee: Marvell International Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/613,465

(22) Filed: Sep. 13, 2012

Related U.S. Application Data

(63) Continuation of application No. 11/803,122, filed on May 11, 2007, now Pat. No. 8,284,411.

(60) Provisional application No. 60/815,330, filed on Jun. 21, 2006.

(51) Int. Cl.
G06F 3/12 (2006.01)
G03G 15/20 (2006.01)
B41J 2/435 (2006.01)

(52) U.S. Cl.
USPC ............... 358/1.13; 399/49; 399/69; 347/232

(58) Field of Classification Search
None
See application file for complete search history.

(56) References Cited

U.S. PATENT DOCUMENTS

| | | |
|---|---|---|
| 2003/0035042 A1 | 2/2003 | Shimada et al. |
| 2005/0088511 A1 | 4/2005 | Jacob |
| 2006/0209167 A1 | 9/2006 | Shiraishi |
| 2006/0222393 A1 | 10/2006 | de Jong et al. |
| 2006/0227354 A1 | 10/2006 | Farrell et al. |
| 2006/0285864 A1 | 12/2006 | Hattori |
| 2006/0291931 A1 | 12/2006 | Kobayashi |

OTHER PUBLICATIONS

Images of laser scanner assembly from a mono laser believed to have been publicly available prior to May 11, 2007 (2 pgs).

*Primary Examiner* — Vincent Rudolph

(57) ABSTRACT

A method and apparatus for faster monochrome printing in an in-line electrophotographic printer is described. The printer is configured such that it has more light emitting sources for use in an image transfer assembly for black than for image transfer assemblies for any other color in the printer. When printing a color print job, less than all of the light emitting sources in the black image transfer assembly are used. A print controller directs print data for a monochrome print job to all of the available light emitting sources in the black image transfer assembly and increases the print medium transport speed. The system and method may be configured to operate with dedicated data channels for each light emitting source or may share some data channels for monochrome and color print jobs.

20 Claims, 7 Drawing Sheets

FASTER MONOCHROME PRINTING FOR IN-LINE ELECTROPHOTOGRAPHIC COLOR PRINTERS

CROSS-REFERENCE TO RELATED APPLICATIONS

This application is a continuation of U.S. patent application No. 11/803,122, filed May 11, 2007, which claims the benefit of U.S. Provisional Application No. 60/815,330, filed Jun. 21, 2006, the entirety of both U.S. patent application No. 11/803,122 and U.S. Provisional Application No. 60/815,330 are hereby incorporated by reference herein.

BACKGROUND

Many electrophotographic printers, such as laser printers, take advantage of basic principles of static electricity to provide a fast and accurate way to print data onto a suitable print medium. An example of a monochrome laser printer 10 is illustrated in FIG. 1. The monochrome printer 10 uses a laser unit 12 to shine a laser beam against a photosensitive drum assembly 14. Before the photosensitive drum assembly 14 is exposed to the laser beam, a uniform positive charge is applied to the drum assembly 14 by a corona wire 16. As the drum assembly 14 rotates, a rotating mirror 18 directs the laser beam across the length of the drum assembly 14 and the portions of the drum assembly 14 illuminated by the laser beam are thereby discharged, leaving a negatively charged electrostatic image. The drum assembly 14 continues along its rotational path and passes a toner assembly 20 having a toner container 22 and a developer roller 24 coated in positively charged toner particles. The negative charge of the electrostatic image on the drum assembly 14 overcomes the weaker negative charge of the developer roller 24 so that toner adheres to the electrostatic image on the drum assembly 14. A piece of paper or other printable medium is then negatively charged and rolled against the drum assembly 14 so that it pulls away the toner, and thus the image, from the drum assembly 14. To affix the image, the paper runs through a fuser 26 that heats the paper. The toner, which is typically a mix of a plastic and pigment, becomes affixed to the paper as the plastic particles melt.

Color laser printers often use the same static electricity principle as monochrome printers, but color printers generally use various proportions of several different colors of toner to achieve the desired print color. A standard set of toner colors employed by a color laser printer to produce a broad palette of colors is: cyan (C), yellow (Y), magenta (M) and black (K). Each of these toner colors needs to be individually applied. Two typical configurations for applying the toner colors in color laser printers are the multipass format and the in-line format.

Multipass color laser printers generally operate by repeatedly passing a piece of paper, or other suitable print medium, by a single photosensitive drum and switching the color toner assembly for each pass. For example, to convert the monochrome printer of FIG. 1 into a multipass color printer the toner assembly 20 of FIG. 1 may be replaced with a carousel of four (C, Y, M and K) toner assemblies and the paper would be passed by the drum assembly 14 four separate times, each time with a different toner assembly rotated into place for the pass. This type of multipass arrangement leads to a monochrome print speed that is four times as fast as the color print speed due to the need for four separate passes of the paper in a color print job and only one pass for the monochrome (e.g. black) print job.

In contrast to the multipass format, an in-line color laser printer operates to move the paper in a single path that travels by each of the four sequentially positioned toner assemblies. This arrangement tends to greatly increase the speed of color printing because repeated cycles are avoided. This arrangement also reduces the perceived speed of the monochrome (K) printing because, due to the same path taken by the paper whether the printer performs a color or monochrome (e.g. black only) print job, there is not necessarily a difference between the color and monochrome print speeds.

Techniques for increasing printer speed include spinning the mirror used to reflect the laser beams onto the electrically charged drum at a faster rate, or using mirrors with an increased number of sides. There tend to be mechanical limits on how fast a mirror can be spun. Also, multi-sided mirrors can be more expensive to manufacture and use. Accordingly, it would be advantageous to increase monochrome printing speed in color laser printers, such as in-line printers, in a more cost efficient manner.

Summary

The present invention is defined by the attached claims, and nothing in this section should be taken as a limitation on those claims. In order to address the need discussed above, described below is a system and method for increasing monochrome print speed relative to color print speed in an in-line electrophotographic color printer.

According to one aspect, a print controller for an electrophotograhic color printer is disclosed. The print controller includes a plurality of print data channels, each of the print data channels configured to convey print data corresponding to a respective one of a plurality of image transfer assemblies supported by the electrophotographic printer, where each of the plurality of image transfer assemblies is associated with a respective color. The print controller also includes a processor configured to operate in a first mode in response to receiving print data for a color print job, where the processor directs the print data associated with each color to a respective one of the print data channels in the first mode. The processor is further configured to operate in a second mode in response to receiving print data for a monochrome print job, where the processor directs the print data associated with a single color over at least two of the plurality of print data channels.

According to another aspect of the invention, a print controller for an electrophotographic color printer includes a plurality of means for conveying print data to a respective one of a plurality of image transfer assemblies supported by the electrophotographic printer, as well as means for directing print data associated with each color of a color print job over a respective one of the plurality of means for conveying in response to receiving print data for a color print job, and for dividing and directing print data associated with a single color over at least two of the plurality of means for conveying in response to receiving print data for a monochrome print job.

A method for increasing the speed of monochrome printing in an electrophotographic color printer is also recited. The electrophotographic printer may have a plurality of image transfer assemblies, where each image transfer assembly is associated with a corresponding color and configured for communication with a print controller via at least one print data channel. In response to receiving print data for a color print job, print data associated with each of the corresponding colors is directed to a respective one of the plurality of image transfer assemblies, where a first number of print data channels are used for each of the plurality of image transfer assemblies. Also, in response to receiving print data for a monochrome print job, print data associated with the monochrome print job is directed to only one image transfer assembly over a second number of print data channels, wherein the second number of print data channels is greater than the first number of print data channels.

In another aspect, an electrophotographic color printer includes a plurality of image transfer assemblies, where each image transfer assembly is arranged to apply a different color to a print medium and each image transfer assembly is sequentially positioned along a print medium path. One of the image transfer assemblies is a black image transfer assembly having at least N+1 light emitting sources and each of a remainder of the image transfer assemblies comprises N light emitting sources, where N is an integer greater than or equal to one.

An electrophotographic color printer is also disclosed that includes a plurality of image transfer means, where each image transfer means is adapted for applying a respective color to a print medium. One of the plurality of image transfer means comprises a black image transfer means having at least N+1 means for emitting light, and each of a remainder of the plurality of image transfer means comprise N means for emitting light, wherein N is an integer greater than or equal to one.

In yet another aspect, a method for increasing monochrome print speed in an electrophotographic color printer is disclosed where the printer includes a plurality of image transfer assemblies and each of the image transfer assemblies is adapted to transfer one of a predetermined set of colors to a print medium. The method includes receiving print data for a monochrome print job and dividing the print data among a plurality of data channels. The method further includes activating a plurality of light emitting sources in a first of the plurality of image transfer assemblies, where the first of the plurality of image transfer assemblies is associated with a first of the predetermined set of colors and the number of activated light emitting sources is greater than the number of light emitting sources utilized in any one of the image transfer assemblies when printing a color print job. A monochrome image is then applied to the print medium.

The following description will now be described with reference to the attached drawings.

DETAILED DESCRIPTION

Figure 1:
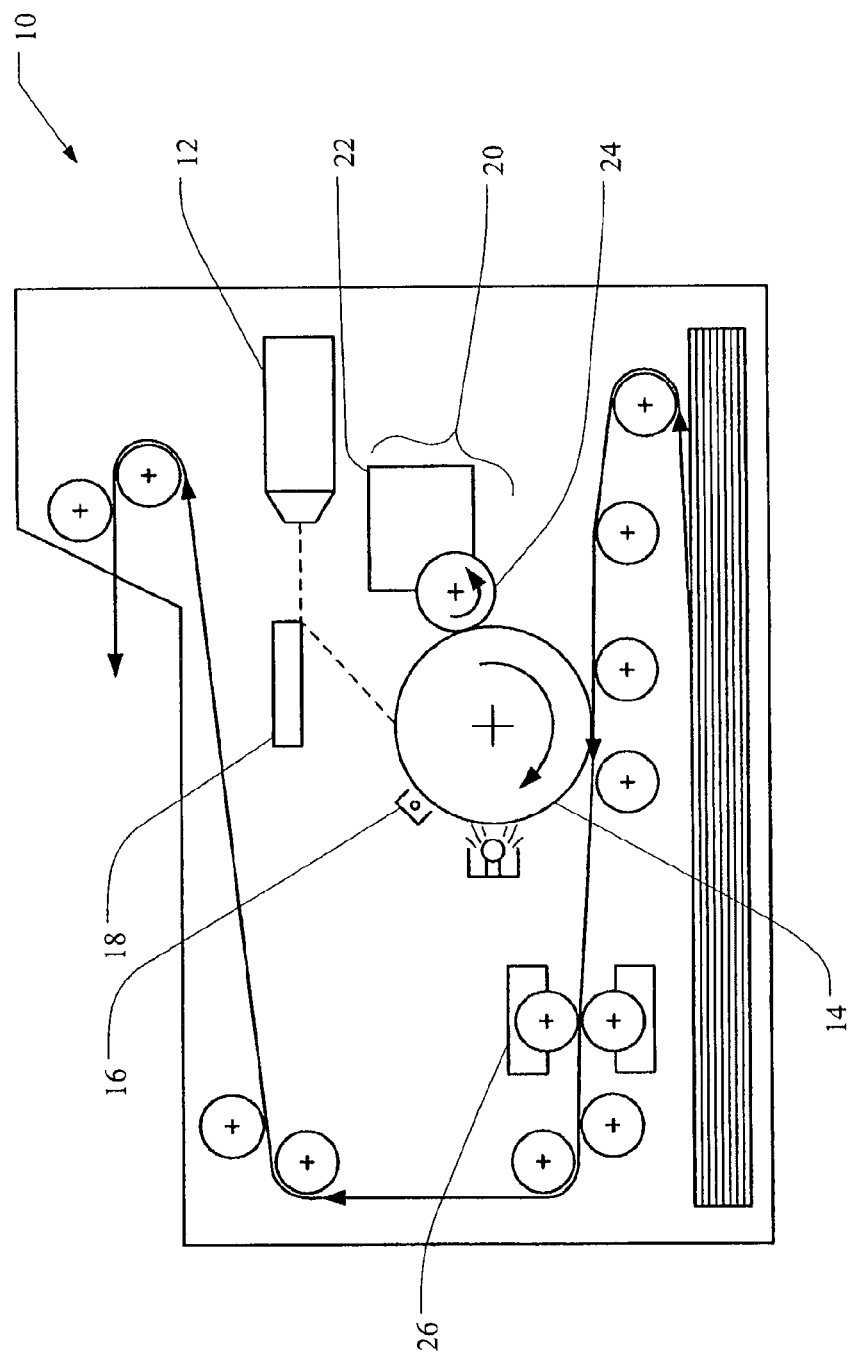
FIG. 1 is a cross-sectional view of a monochrome printer.
Figure 2:
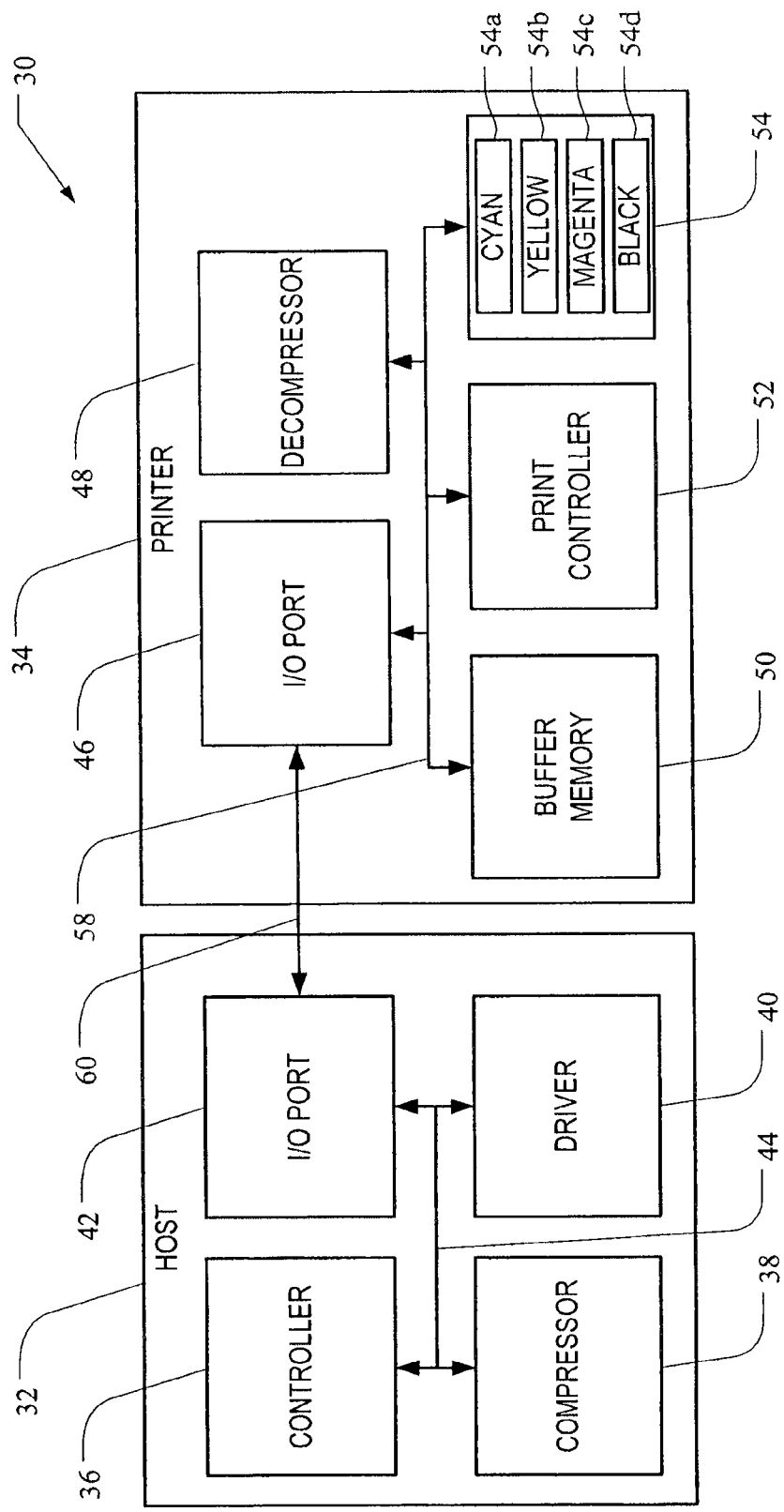
FIG. 2 is a block diagram of an image processing system.

An embodiment of an image processing system 30 is illustrated in FIG. 2. The image processing system 30 may include a host 32 and an electrophotographic printer 34. In the illustrated embodiment, host 32 includes a controller 36, a compressor 38, driver 40 and an I/O port 42, all of which are coupled to a bus 44. In one implementation, the host 32 may be a stand-alone computer or networked computer. The electrophotographic printer 34 may include an I/O port 46, a decompressor 48, a buffer memory 50, a print controller 52 and image transfer assemblies 54a-d, all of which are coupled to a bus 58. The printer 34 communicates with the host 32 via a communication link 60. Communication link 60 is coupled between I/O port 42 and I/O port 46.

The controller 36 in the host 32 may convert an image from the red- green-blue (RGB) color space to the cyan-yellow-magenta-black (CYMK) color space before sending the image to printer 34. The host 32 may retain images in the RGB color space format because information is displayed by the host 32 using additive color mixing with red, green and blue. The image in the CYMK color space is separated into cyan, yellow, magenta and black colors or color planes. The controller 36 is configured to separate or partition an image to be printed into the C, Y, M and K colors that define how the printer 34 will apply the toner to a print medium.

If data compression is desired or necessary, a compressor 38 in the host 32 reduces the size of the print data through the use of an image compression technique. The compressor 38 may be a processor arranged to execute instructions for implementing an image compression format that are stored in memory in the host 32. Alternatively, the compressor 38 may be firmware or software including processor executable instructions for use by a processor in the controller 36 to execute a desired compression algorithm. Examples of suitable image compression formats include JPEG (the standard written by the Joint Photographic Experts Group) or JBIG (the standard written by the Joint Bi-level Image Expert Group). While JPEG and JBIG each have certain advantages, in other embodiments the print data are not compressed or are compressed using other suitable approaches.

Referring again to FIG. 2, the driver 40 sends data and instructions for a print job between the host 32 and the printer 34. The driver 40 may be implemented as hardware, as firmware or as software consisting of processor executable instructions for use by a processor in the host. In this embodiment, the CYMK color model is used and thus the toner colors applied to the print medium are cyan, yellow, magenta and black. In other embodiments, other suitable color models and toner colors can be used.

Figure 3:
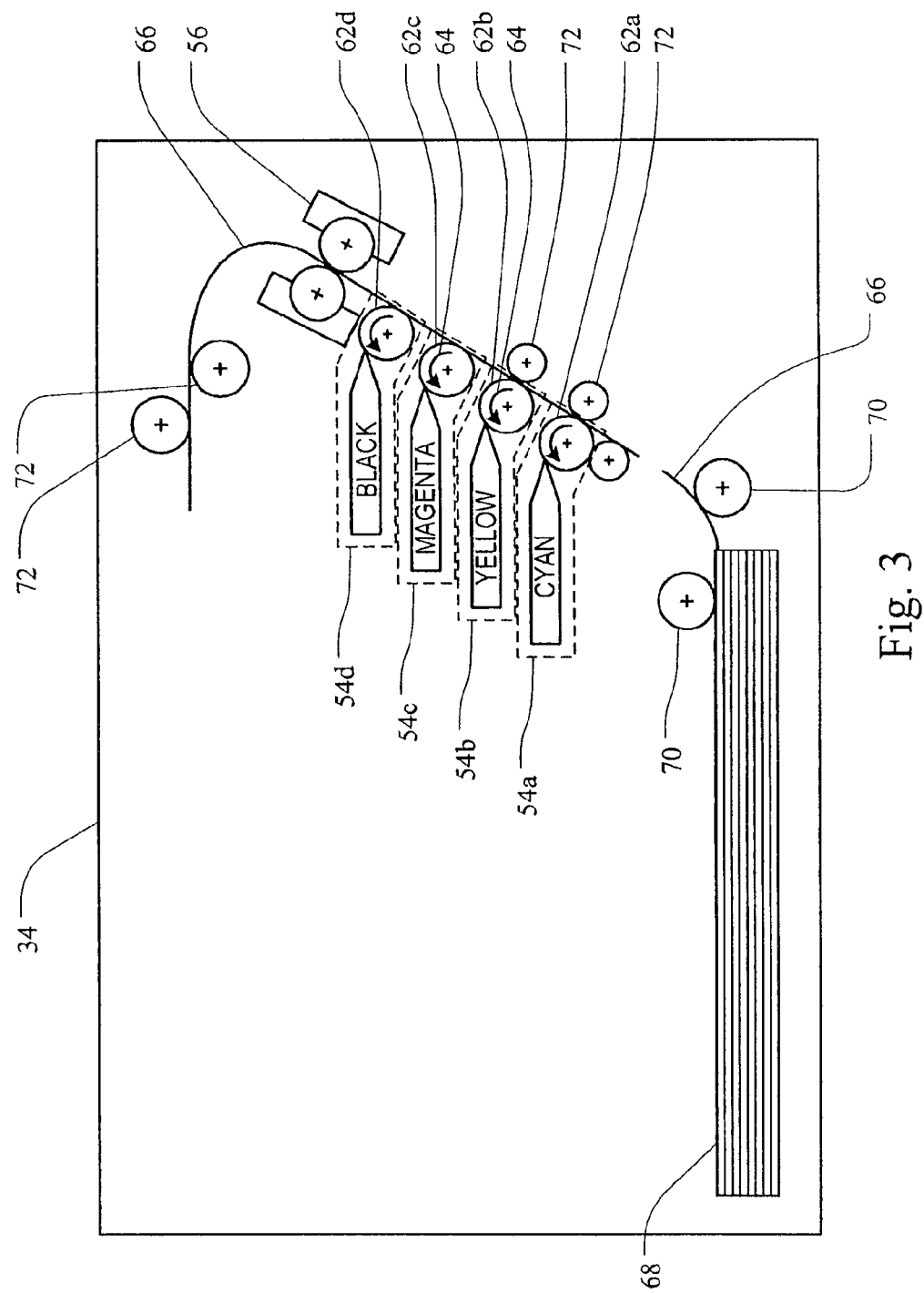
FIG. 3 is a diagram illustrating an embodiment of an in-line electrophotographic printer.

In one embodiment, the printer 34 is an in-line color laser printer. In other implementations, the printer 34 can be other types of in-line electrophotographic printers such as a light emitting diode (LED) printer, or other non- in-line printers such as thermal printers that use a laser in combination with a thermally sensitive drum rather than a photosensitive drum. As illustrated in the simplified mechanical diagram of FIG. 3, the printer 34 applies the toner colors in sequential order to a print medium 66 as print medium 66 is moved through the printer 34. The printer 34 uses sequentially arranged image transfer assemblies 54a-d each positioned along the path of the print medium 66. In the embodiment of FIG. 3, the image transfer assemblies 54 include an image transfer assembly 54a for cyan, an image transfer assembly 54b for yellow, an image transfer assembly 54c for magenta and an image transfer assembly 54d for black.

Each of the image transfer assemblies 54 includes a drum 62a-d onto which an electrostatic image is generated by a light source, such as a laser, and to which toner associated with the respective image transfer assembly 54 is applied. The drums 62a-d rotate in the direction indicated by arrows 64. As the drums rotate, the image is formed on and transferred from each drum in a staggered fashion so that the image transferred to the print media at the drum 62a in the cyan image transfer assembly 54a aligns with the same portion of the image transferred at the drum 62b of the yellow image transfer assembly 54*b*, and so on through the magenta and black image transfer assemblies 54*c-d*. Thus, the cyan data for a particular portion of the image is processed prior to the yellow, magenta and black data for that same portion of the image based on the spacing between the drums and the speed at which the print medium is passed through the printer 34.

The print medium 66, which may be any of a number of materials, such as paper, plastic transparency, self-adhesive labels and other materials capable of receiving toner-based transfers of image data, may be moved from a paper tray 68 by rollers 70. Additional rollers 72 guide the print medium 66 by each of the drums 62*a-d* to receive a transfer of the image so that the complete image includes overlapping toner colors as the print medium passes by the black toner image transfer assembly 54*d*. As the print medium 66 passes by the drum 62*d* of the black image transfer assembly 54*d*, the print medium 66 is moved through a fuser 56. The fuser 56 includes a pair of rollers, where the roller on the toner side of the print medium 66 is heated to melt the toner and cause the toner to fuse to the print medium 66. The spacing of the image transfer assemblies 54, the number and position of the print media guide rollers 70, 72, and other mechanical arrangements within the printer 34 may be implemented as necessary to accommodate printer size and application specific needs for the printer 34.

Figure 4:
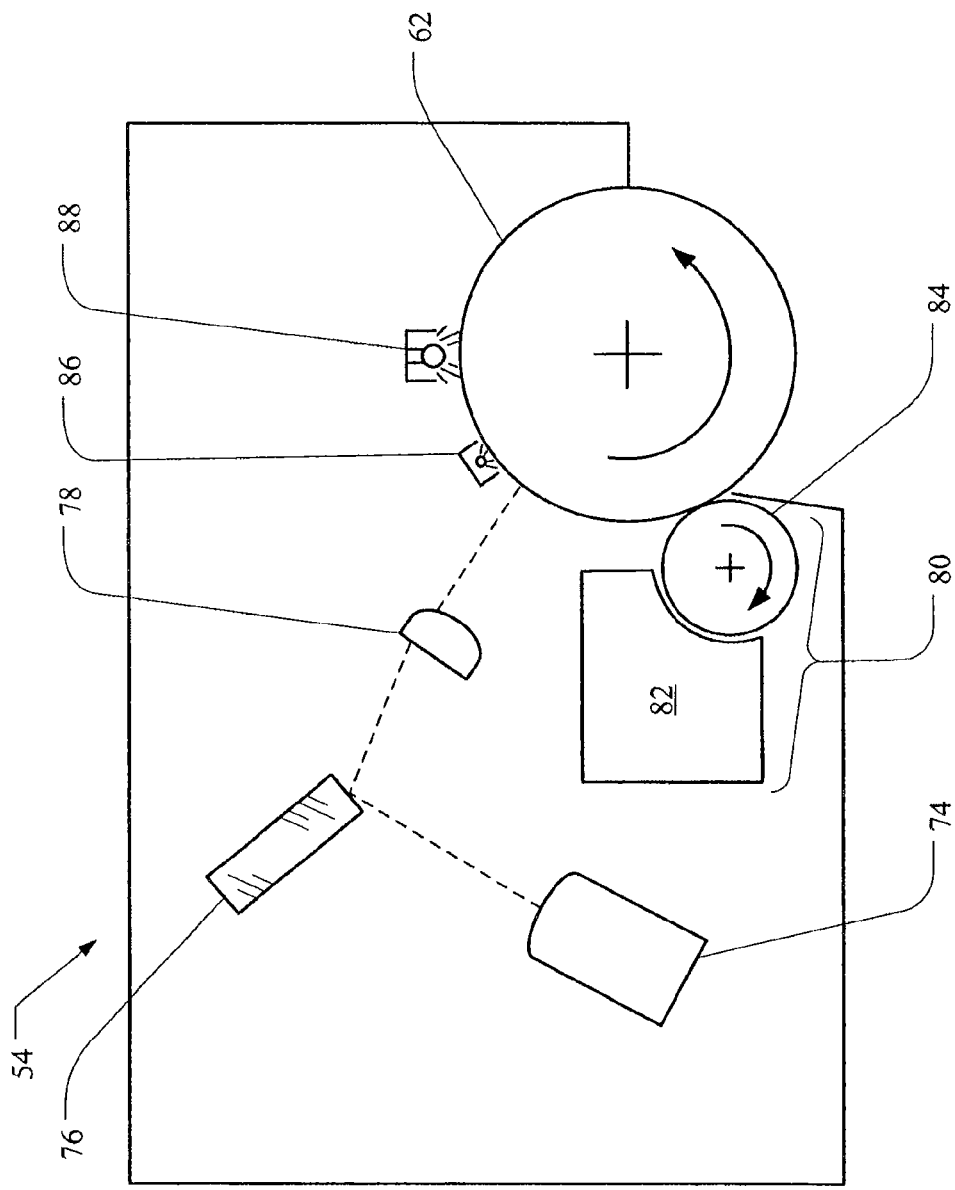
FIG. 4 illustrates an image transfer assembly suitable for use in the printer of FIG. 3.

As shown in FIG. 4, each image transfer assembly 54 may include a light emitting unit 74, a photosensitive drum 62, a rotating mirror 76 configured to reflect light from the light emitting unit 74 through a corrective lens 78 and across the photosensitive drum 62, and a toner assembly 80 having a supply 82 of toner of the appropriate color and a developer roller 84. A corona wire 86 and, optionally, a discharge unit 88 may be positioned in the image transfer assembly 54 adjacent the photosensitive drum 62 to charge and discharge, respectively, the photosensitive drum 62 prior to each rotation past the light beam emitted by light emitting unit 74. In other arrangements, two rotating mirrors 76 may be shared, where a first two of the four image transfer assemblies 54 share the first rotating mirror 76 and the second two of the image transfer assemblies 54 share the second rotating mirror 76. In yet other arrangements, a single rotating mirror 76 may be shared by all of the image transfer assemblies 54.

Figure 5:
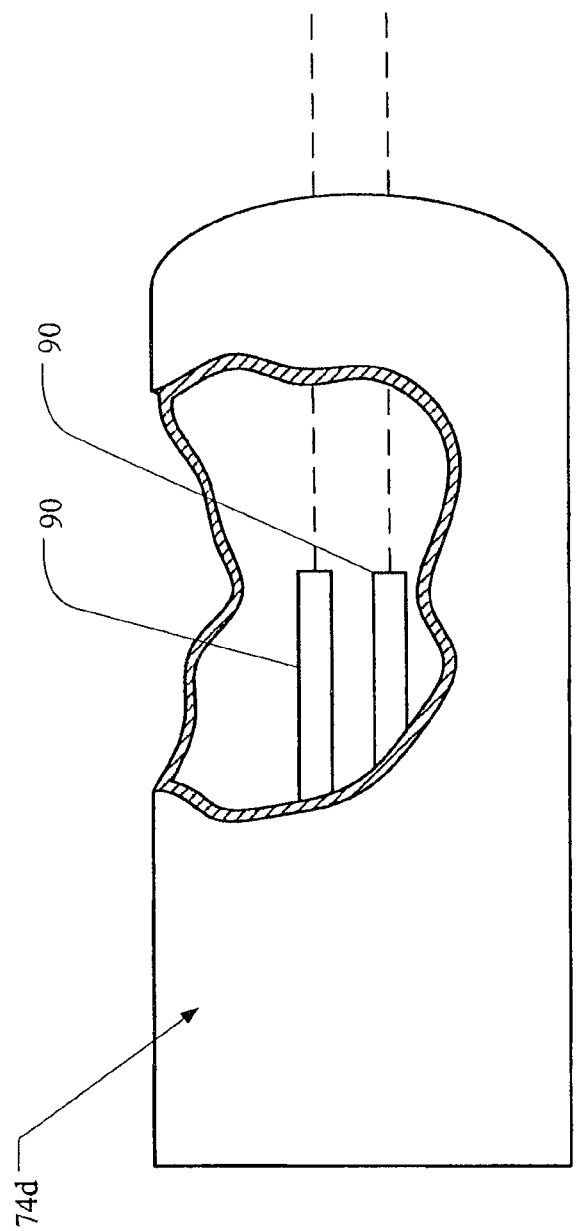
FIG. 5 is a sectional view of a light emitting unit containing multiple light emitting sources suitable for use in the image transfer assembly of FIG. 4.

As shown in FIG. 5, in one embodiment, the black image transfer assembly 54*d* has two light emitting sources 90 in its light emitting unit 74*d*. In this embodiment, each of the remaining image transfer assemblies 54*a-c* has a single light emitting source 90 such that, for a CYMK color model printer such as illustrated in FIG. 3, a total of four light emitting units 74 having a total of five light emitting sources 90 are included in the printer 34. Alternatively, each of the cyan, magenta and yellow image transfer assemblies 54*a-c* may have an equal number N light emitting sources 90 and the black image transfer assembly 54*d* has at least N+1 light emitting sources 90, where N is a whole number greater than or equal to 1. Any of a number of known types of lasers, light emitting diodes or other light emitting sources 90 may be used in the light emitting units 74 of image transfer assemblies 54*a-d*. In other embodiments, the light emitting sources 90 may be distributed among more than one light emitting unit 74 in a particular image transfer assembly 54.

Referring again to FIG. 2, a print controller 52 in the printer 34 controls the image data generation and electro-mechanical control functions that determine print quality and speed of the printer 34. The print controller 52 communicates with the host 32 via the communication link 60 to receive print job data and transmit printer and print job status information. In various embodiments, the communication link 60 can be implemented in wired or wireless fashion using any of a number of known types of communication interfaces such as a parallel port, a USB port (the standard by the USB Implementers Forum), IEEE 1394 (FireWire) or a network interface. I/O ports 42 and 46 are configured to send and receive information over the communication link 60 in accordance with the type of port used.

Figure 6:
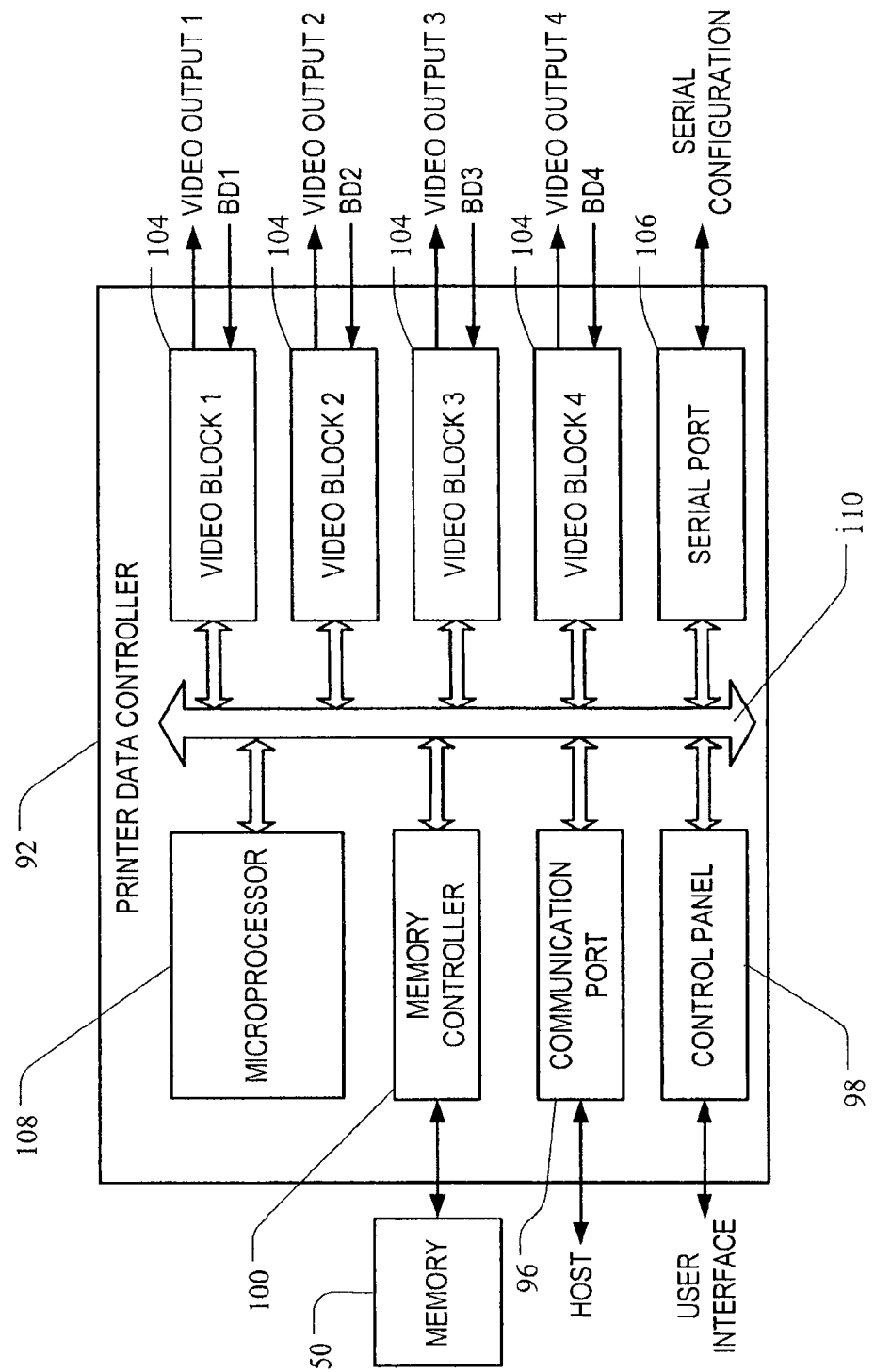
FIG. 6 is a block diagram illustrating a printer data controller suitable for use in the printer of FIG. 3.
Figure 7:
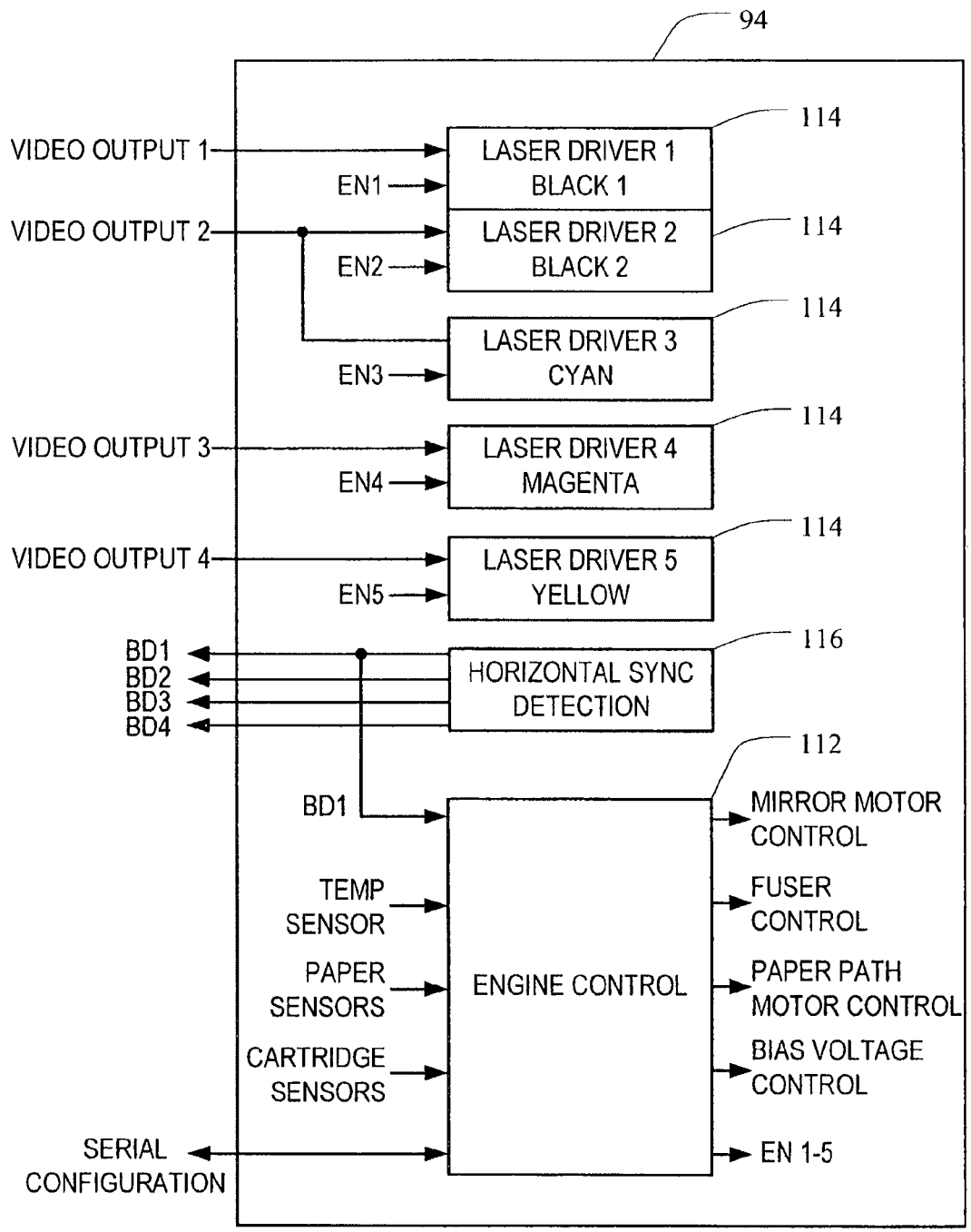
FIG. 7 is a block diagram of a printer engine controller suitable for use in the printer of FIG. 4.

As shown in FIGS. 6 and 7, the print controller 52 may be implemented as two separate circuits, with a printer data controller 92 that receives, manipulates and distributes print job data, and a printer engine controller 94 that manages the electro-mechanical tasks in the printer. Referring to FIG. 6, the printer data controller 92 may include an communication port 96 arranged to communicate with the host 32, via the I/O port 46 of the printer 34, and a control panel interface 98 for receiving commands and display information at a user interface on the printer 34. A memory controller 100 in the printer data controller 92 may communicate with the memory 50 in the printer 34 to store or retrieve print job data and/or retrieve processor executable instructions for manipulating the print job data. In other embodiments, the printer data controller 92 may include its own memory.

A serial port 106 in the printer data controller 92 provides a communication channel with which to communicate with the printer engine controller 94. The printer data controller 92 also includes a plurality of video blocks 104, each defining a print data channel, over which a microprocessor 108 in the printer data controller 92 transmits the print job data received from the host 32. Each video block 104 outputs a video output signal containing the data destined for a respective one of the light emitting units 74 in each of the image transfer assemblies 54. Preferably, the printer data controller 92 is configured with a number of video blocks 104 corresponding to the number of image transfer assemblies 54. Each of the video blocks 104 provides a data channel for print job data associated with the color plane handled by the light emitting unit 74 in the image transfer assembly in communication with that video block. Thus, for a color print job, the microprocessor 108 will send each of the four video blocks 104 of the printer data controller 92 data for a respective one of the C, Y, M and K image transfer assemblies.

In addition to outputting a video signal, each video block 104 receives a beam detect signal indicative of a start of a beam sweep. The video blocks 104 in the printer data controller 92, as well as the serial port 106, control panel 98, communication port 96, memory controller 100 and microprocessor 108, all communicate in the printer data controller 92 along a common data bus 110. In one embodiment, the printer data controller 92 may be formed as an application specific integrated circuit (ASIC), although discrete or distributed implementations of some or all of these functions are also contemplated.

Referring to FIG. 7, the printer engine controller 94 includes an engine controller processor 112, driver circuits 114 for each of the light emitting sources 90 in the light emitting units 74 available in the image transfer assemblies, and a horizontal sync detection circuit 116. Each of the driver circuits 114 receive the respective one of the video outputs from the video blocks 104 of the printer data controller 92 and provides a buffering function to present the signal on the video outputs at an appropriate voltage and/or current level to drive the light emitting sources 90. In one implementation, where the light emitting sources 90 are lasers, the driver circuits 114 are laser driver circuits. In this implementation, each of the drivers 114 also includes an enable input that communicates with the engine controller processor 112 to allow the engine controller processor 112 to turn on or off one or all of the driver circuits 114, and thus disable those particular lasers.

The horizontal sync detection circuit 116 receives sensor information from each of the image transfer assemblies, for each of the light emitting sources 90 within the image transfer assemblies 54, indicative of the beginning of a beam sweep across the drum of each respective image transfer assembly. In one implementation, each of the image transfer assemblies 54 may have a photodetector aligned with the laser so that the beam sweep of the laser will cross, and thus trigger, the photodetector prior to each sweep of the beam across the photosensitive drum of the particular image transfer assembly. The horizontal sync detection circuit 116 sends each respective beam detect signal back to the printer data controller 92 over respective beam detect signal lines so that the printer data controller 92 can synchronize processing and delivery of image data for a print job.

The engine controller processor 112 may also receive several additional data inputs, such as a temperature sensor input relating to the temperature of the fuser, input from paper sensors relating to the presence or progress of paper through the printer, and cartridge sensors that may include input from each of the image transfer assemblies relating to, for example, whether there is sufficient toner in a particular image transfer assembly. Using the various sensor inputs, as well as the commands received from the printer data controller 92 over the serial data link, the engine controller processor 112 may control mirror rotation, fuser activation and temperature, motor speed for rollers along the paper path, the bias voltage for bias applied to the toner in each of the image transfer assemblies 54 and/or the paper tray 68 and other electromechanical aspects of the printer 34.

Using the printer 34 of FIGS. 2-7, methods of increasing monochrome print speed may be implemented. A first method for increasing print speed is to simply use the greater number of light emitting sources available for a monochrome print job. Thus, for the 5 light emitting source embodiment described above (2 for K and 1 each for C, Y and M), the two light emitting sources in the black image transfer unit would be activated for a monochrome print job, while only a single light emitting source for each of the four image transfer assemblies, would be used for a color print job. In other embodiments where each of the C, Y and M image transfer assemblies have N light emitting sources and the K image transfer assembly includes a number of light emitting sources greater than N, the N light emitting sources in each image transfer assembly would be needed for color print jobs, while the greater than N light emitting sources in the K image transfer assembly would be enabled for a monochrome print job.

In order to accelerate the pace of the monochrome (K) printing with respect to color printing (CYMK) without having to increase the per channel data rate capability of the video blocks 104 in the printer data controller 92, and thus without needing to increase the mechanical speed of the rotating mirror 76 sweeping the beam across the photosensitive drum 62d of the black image transfer assembly 54d, the printer data controller 92 may be configured to recognize that print data from the host 32 represents a monochrome print job and divide each scan line of the monochrome print data into two separate video blocks 104. In this manner, a video block 104 previously used exclusively for one of the other colors, for example cyan, would be instead sent lines of monochrome print job data destined for one of the two light emitting sources 90 in the black image transfer assembly 54d. Accordingly, the cumulative rate of monochrome data would be twice the previous data rate for any one color in a color print job (in this example) but the printer data controller 92 would maintain the same per data channel (per video block 104) data rate. Additionally, the two light emitting sources 90 for the black channel may sweep across the photosensitive drum 62d of the black image transfer assembly 54d at the same rate as would be applied in a color print job so that faster or more complex rotating mirrors may be avoided.

In a monochrome print job, where two light emitting sources 90 are simultaneously scanning, the paper feed rate would be increased by the microprocessor 108 in the printer data controller 92 via a command through the serial link to the engine controller processor 112. Given a cumulative data rate in the monochrome print job of twice that of a single color in a color print job and the same resolution, the printer data controller 92 would command the engine controller processor 112 to double the print medium speed and to increase the fuser temperature to accommodate the faster moving print medium.

In an implementation of the printer 34 where two lasers are provided for the black image transfer assembly 54d and one laser is provided in each of the other remaining image transfer assemblies 54a-c, it is contemplated that the microprocessor 108, based on instructions in firmware or in memory 50, would be configured to communicate with the host 32 to obtain portions of print job data relating to segments of a printed page, for example stripes of 100 pixel lines, and divide these 100 lines into even line information directed to video block 1 and odd line information directed to video block 2. In one embodiment, a video block 104 would begin sending a line of data to a laser driver 114 upon receipt of the beam detect signal indicating that the laser is beginning its sweep of a line of data. The print job data may be stored in memory 50 as a block of contiguous data and a configuration register may provide information on where to transfer the data and how much data to transfer. Each video block 104 may be configured to know where to get data, how long a line of data is, how many lines to process and how many lines of data to skip after each line read. In this manner, the data in memory 50 may be arranged in the same manner for either single beam or multiple beam printing, where the data would not need to be split or moved in memory 50, because each video block 104 may be configured to only read the data it needs.

During a monochrome print job where only the black image transfer assembly 54d is necessary, the microprocessor 108 may send the engine controller processor 112 a request to shut down the image transfer assemblies 54a-c for the other toner colors. The engine controller processor 112 may be configured to accomplish this task in any of a number of ways. For example, in the embodiment of FIG. 7, the engine controller processor 112 can completely disable the driver circuits 114 for the data going to the C, Y and M image transfer assemblies 54a-c. Alternatively, the engine controller processor 112 could interpret a command for a shut down of these image transfer assemblies 54a-c to mean turning off the bias voltage to the toner assembly 80 for each of the C, Y and M image transfer assemblies so that no toner would be applied by the non-black image transfer assemblies. In yet other alternatives, the engine controller processor 112 may combine both sending a disable signal to the laser driver and turning off the toner voltage bias.

In one embodiment, a shared video block technique may be used for improving monochrome printer speed without increasing the per video channel data rate or mirror speed. In this embodiment, the number of light emitting sources 90 associated with the black image transfer assembly 54d may be as high as the number of video blocks 104 so that all of the video blocks 104 may be used to divide up a monochrome signal among different light emitting sources 90 in the black image transfer assembly 54d. For each light emitting source 90 in the black image transfer assembly 54d, a corresponding driver circuit 114 would also be used, each with its own enable command input to allow individual control by the engine controller processor 112.

In yet other embodiments, it is contemplated that the printer data controller 92 may be configured with dedicated video blocks for the total number of light emitting sources residing in all of the image transfer assemblies such that, rather than using a video block previously associated with a color other than black during a color print job, additional dedicated video blocks corresponding to the additional laser units in the black image transfer assembly may be used. In this embodiment, an increase in monochrome print speed as compared to a color print speed could be based on the number of extra lasers the black image transfer assembly had over the remaining image transfer assemblies. As in the shared video block implementation described above, the engine controller processor 112 would adjust the paper speed and fuser temperature to accommodate the change in print speed for a monochrome print job.

As has been described, a method for increasing the monochrome print rate in an in-line electrophotographic color printer, such as a laser printer, has been disclosed. The printer preferably includes an increased number of laser units in the black image transfer assembly as compared to the image transfer assemblies for the remaining colors, in this example, cyan, yellow and magenta. In the five beam laser system disclosed in the figures, one beam is associated with each of the C, Y and M channels and two beams for the K channel. For monochrome printing, the print medium, which may be paper or any other medium suitable to receive the type of toner used, could move twice as fast. The rotatable mirror 76 for scanning the beam across the photosensitive drum 62 would not need to change speed. Use of the dual monochrome beams and two channels in the in-line printer 34 can double the speed of the pages printed in monochrome with a minimal amount of extra hardware. If, as disclosed in FIG. 6, the printer data controller 92 includes only four video blocks 104, the extra monochrome data channel can be fashioned from one of the three unused color video blocks 104 to provide the increased cumulative monochrome data rate. In other embodiments, where the printer data controller 92 includes dedicated video blocks for each light emitting source 90, the non-black color channels would simply go unused. Thus, for the five beam system described above and modified to include a dedicated video block 104 for each light emitting source 90, three video blocks 104 would go unused during a monochrome print job.

An advantage of the disclosed system and method is that an effective increase data rate is available for monochrome printing without needing to change the hardware to accommodate for a per channel increase in data rate. A monochrome print job at twice the color speed would still have the same or lower data processing and memory bandwidth requirements as compared the full four beam, in-line color print job at normal speed. The video rate would be substantially identical since the laser scanner rate and print resolution would not change. In contrast to doubling the speed of the printer for both color and monochrome printing, where extra hardware would be necessary for each of the remaining three beams and the image processing requirements would be doubled, a system and method as disclosed above that increases only the number of lasers in the black image transfer assembly and reuses video blocks may present a significantly more flexible and cost-effective printing system. Alternatively, embodiments where additional lasers for the black image transfer assembly are coupled with dedicated video blocks rather than shared video blocks may permit cost and performance advantages over in-line printers having equal number of lasers for all of the image transfer assemblies. Although in-line electrophotographic color printers have been specifically addressed above, it is contemplated that the method and systems discussed herein may be applied to other color printer formats and color printers that are not configured in an in-line arrangement.

It is intended that the foregoing detailed description be understood as an illustration of selected forms that the invention can take and not as a definition of the invention. It is only the following claims, including all equivalents, that are intended to define the scope of this invention.

What is claimed is:

1. An electrophotograhic color printer system, the system comprising:
 a controller configured to:
  communicate with a plurality of image transfer assemblies, each image transfer assembly arranged to apply a different color to a print medium;
  operate in a monochrome mode in response to a receipt of print data for a monochrome print job, and
  direct the print data for the monochrome print job to a black image transfer assembly using a monochrome print data channel and one of a plurality of print data channels other than black in the monochrome mode, each print data channel configured to convey print data corresponding to a respective image transfer assembly.

2. The system of claim 1, wherein the controller is further configured to generate a command for increasing a rate of movement of a print medium through the electrophotographic printer system in response to the receipt of print data for the monochrome print job.

3. The system of claim 1, wherein the controller is configured to increase a fuser temperature for a fuser in the electrophotographic printer system during printing of the monochrome print job.

4. The system of claim 1, wherein the plurality of image transfer assemblies comprises one image transfer assembly for each of cyan, magenta, yellow and black.

5. The system of claim 1, wherein the controller is further configured to operate in a color mode in response to a receipt of print data for a color print job, wherein the controller directs the print data associated with each color to a respective one of the plurality of print data channels in the color mode.

6. The system of claim 5, wherein the print data for the color print job comprises print data for at least two colors selected from the group consisting of cyan, magenta, yellow and black.

7. The system of claim 5, wherein the controller is further configured to divide the print data of the monochrome print job into two separate video blocks.

8. The system of claim 1, wherein the controller is further configured to divide the print data of the monochrome print job into a first portion comprising even lines of print data and a second portion comprising odd lines of the print data.

9. The system of claim 8, wherein the controller is configured to send the first portion to one of the plurality of print data channels other than black and the second portion to the monochrome print data channel.

10. The system of claim 1, wherein one of the plurality of image transfer assemblies comprises a black image transfer assembly having at least N+1 light emitting sources and each of a remainder of the plurality of image transfer assemblies are color image transfer assemblies comprising N light emitting sources, wherein N is an integer greater than or equal to one.

11. A method for increasing a speed of monochrome printing in an electrophotographic color printer system, the method comprising:
communicating with a plurality of image transfer assemblies, each image transfer assembly arranged to apply a different color to a print medium;
operating in a monochrome mode in response to a receipt of print data for a monochrome print job, and
directing the print data for the monochrome print job to a black image transfer assembly using a monochrome print data channel and one of a plurality of print data channels other than black in the monochrome mode, each print data channel configured to convey print data corresponding to a respective image transfer assembly.

12. The method of claim 11, further comprising:
generating a command for increasing a rate of movement of a print medium through the electrophotographic printer in response to the receipt of print data for the monochrome print job.

13. The method of claim 11, further comprising:
generating a command to increase a fuser temperature for a fuser in the electrophotographic printer during printing of the monochrome print job.

14. The method of claim 11, wherein the plurality of image transfer assemblies comprises one image transfer assembly for each of cyan, magenta, yellow and black.

15. The method of claim 11, further comprising:
operating in a color job mode in response to a receipt of print data for a color print job, and
directing print data for the color print job to a respective one of the plurality of image transfer assemblies.

16. The method of claim 15, wherein the print data for the color print job comprises print data for at least two colors selected from the group consisting of cyan, magenta, yellow and black.

17. The method of claim 11, further comprising dividing the print data of the monochrome print job into a first portion comprising even lines of print data and a second portion comprising odd lines of the print data.

18. The method of claim 17, further comprising:
sending the first portion to one of the plurality of color print data channels other than black, and
sending the second portion to the monochrome print data channel.

19. The method of claim 11, wherein one of the plurality of image transfer assemblies comprises a black image transfer assembly having at least N+1 light emitting sources and each of a remainder of the plurality of image transfer assemblies are color image transfer assemblies comprising N light emitting sources, wherein N is an integer greater than or equal to one.

20. The method of claim 11, further comprising:
dividing the print data of the monochrome print job into two separate video blocks.

* * * * *